United States Patent [19]

Ogawa

[11] Patent Number: 4,552,657
[45] Date of Patent: Nov. 12, 1985

[54] FILTER

[75] Inventor: Yonekichi Ogawa, Tokyo, Japan

[73] Assignee: Suisaku Kabushiki Kaisha, Tokyo, Japan

[21] Appl. No.: 636,435

[22] Filed: Jul. 31, 1984

[30] Foreign Application Priority Data

Jan. 24, 1984 [JP] Japan .................................. 59-11561

[51] Int. Cl.⁴ .............................................. B01D 35/02
[52] U.S. Cl. .................................... 210/169; 210/266; 210/317; 210/409; 210/416.2; 210/493.1
[58] Field of Search ............... 210/169, 317, 266, 409, 210/416.2, 493.1

[56] References Cited

U.S. PATENT DOCUMENTS

| | | | |
|---|---|---|---|
| 2,538,575 | 1/1951 | Kracklauer | 210/409 |
| 3,313,421 | 4/1967 | Falkenberg et al. | 210/317 |
| 3,333,701 | 8/1967 | Scafuro | 210/169 |
| 3,554,375 | 1/1970 | Willinger | 210/169 |
| 4,035,298 | 7/1977 | Cloke et al. | 210/169 |
| 4,206,054 | 6/1980 | Moore et al. | 210/169 |
| 4,276,163 | 6/1981 | Gordon | 210/169 |

Primary Examiner—Tim Miles
Attorney, Agent, or Firm—Armstrong, Nikaido, Marmelstein & Kubovcik

[57] ABSTRACT

A filter comprising a filter case the interior of which is divided by a separator into upper and lower filtration chambers, a compact filter material of a cylindrical shape disposed in said upper filtration chamber so as to define on both outer and inner sides thereof a non-purification chamber communicating with upper suction ports formed at the upper part of said filter case and a purification chamber communicating with a drain pipe disposed on the upper surface of said filter case and having a large capacity, and a coarse filter material housed in said lower filtration chamber and serving also as a weight, said lower filtration chamber communicating with said purification chamber through passage ports formed in said separator while communicating with lower suction ports formed in a bottom surface of said filter case, said purification chamber communicating with an air feed port connected to an air pump.

3 Claims, 12 Drawing Figures

FILTER

BACKGROUND OF THE INVENTION

1. Field of the Invention

This invention relates to a filter of water for keeping aquarium fishes such as goldfishes, tropical fishes, saltwater fishes, and the like.

2. Description of the Prior Art

A conventional filter used inside a water tank for keeping goldfishes, tropical fishes, and the like blows air into water by an air pump or the like to generate a water flow, and filtrates the water in the tank by feeding the water flow as a whole through a filter material. If the flow velocity of the water passing through the filter material is too great, however, aerobic bacteria that decompose organic matters such as chlorella, residual bait and droppings of fishes, and the like, can not be propagated, so that the water quality would be deteriorated. If the flow velocity is reduced, on the other hand, oxygen can not sufficiently be supplied into the water, and an air pump for supplying oxygen must be used additionally. If the filter material gets clogged, the water flow becomes weak and will invite the insufficiency of oxygen in the water.

SUMMARY OF THE INVENTION

It is therefore an object of the present invention to provide a compact and highly efficient filter having a construction in which the interior of a filtration case disposed inside a water tank is vertically divided into upper and lower filtration chambers, a compact filter material having a relatively large filtration area is disposed inside the upper filtration chamber while a coarse filter material is disposed in the lower filtration chamber so that the flow velocity of water passing through the compact filter material is made relatively small in order to promote the propagation of aerobic microorganisms including bacteria such as chlorella on the filter material and thus to improve the purification efficiency of contaminated water inside the water tank, and a sufficiently large filtration capacity can be obtained by the two filter materials disposed in the upper and lower filtration chambers even if the capacity of the filter case capacity is reduced.

The filter in accordance with the present invention to accomplish the object described above has a construction in which the interior of a filter case is divided by a separator into upper and lower filtration chambers, a compact filter material has a cylindrical shape and is disposed inside the upper filtration chamber so as to define the chamber into an outside non-purification chamber communicating with an upper suction port disposed at the upper part of the filter case and an inside purification chamber communicating with a discharge pipe disposed on the upper surface of the filter case and having a large capacity, the lower filtration chamber communicates with the purification chamber through passage ports formed in the separator, the lower filtration chamber communicates with lower suction ports formed in the bottom surface of the filter case, the coarse filter material serving also as a weight is placed inside the lower filtration chamber, and an air feed port connected to an air pump is connected to the purification chamber.

With the construction described above, the contaminated water inside the water tank is divided into two flows, that are introduced into the upper and lower filtration chambers from the upper and lower suction ports, and can be filtrated by the compact filter material and the coarse filter material disposed in these filtration chambers, respectively. Therfore, a compact filter having a high filtration efficiency can be obtained by relatively increasing the total filtration area of the two filter materials, even if the capacity of the filter case is reduced.

The velocity of flow of the contaminated water that passes through the compact filter material inside the upper filtration chamber is much smaller than that of flow of the contaminated water passing through the coarse filter material having low flow resistance inside the lower filtration chamber, so that aerobic microorganisms including bacteria such as chlorella, that will not grow if the flow velocity is great, can be vigorously propagated, decomposing organic matters attaching to the compact filter material such as the residual bait and dropping of fishes, preventing clogging of the filter material and further improving the purification capacity.

Since the lower suction port is disposed on the bottom surface of the filter case, the water inside the water tank can be introduced into the lower filtration chamber from the lower suction port through the gaps between pebbles that are spread on the bottom surface. This arrangement makes it possible to provide air permeability to the pebbles on the bottom surface of the water tank, to propagate the aerobic bacteria to let them purify the contaminated water, to restrict the propagation of aerophobic bacteria that exert adverse influences upon the growth of the aquarium fishes, and to keep the water quality at a suitable level.

Furthermore, the coarse filter material placed inside the lower filtration chamber also serves as a weight when the filter is placed inside the water tank, so that a separate weight need not be disposed, contributing to the reduction of size of the filter.

Since the purification chamber of the upper filtration chamber has a relatively large capacity, the air jetted into the purification chamber from the air feed port connected to the air pump does not form large discontinuous bubbles, but rises as small continuous bubbles inside the purification chamber and is discharged from the discharge pipe into the water tank. Such fine bubbles do not deteriorate the appearance of the water tank, and a continuous rising water flow can be generated inside the lower flow chamber.

It is another object of the present invention to provide a filter having a construction in which the peripheral wall of a compact cylindrical filter material is formed as a corrugated wall consisting of long wave portions having a large wave height and extending radially in the circumferentially spaced manner, and short wave portions formed continuously between adjacent long wave portions and having a short wave height, this configuration serving markedly to increase the filtration capacity without increasing the outer diameter of the filter material.

It is still another object of the present invention to provide a filter in which sludge attaching to the outer surface of the compact filter material can be automatically removed without the necessity of manual work.

These and other objects, features and advantages of the present invention will become more apparent from the following description of preferred embodiments thereof to be taken in conjunction with the accompanying drawings.

BRIEF DESCRIPTION OF THE DRAWINGS

FIGS. 1 through 3 illustrate a first embodiment of the present invention, wherein:

FIG. 1 is a sectional view taken along line I—I of FIG. 2, and showing the state of a filter according to the invention where the filter is placed inside a water tank;

FIG. 2 is a sectional view taken along line II—II of FIG. 1; and

FIG. 3 is a perspective view showing the filter under an exploded state.

FIGS. 4 through 6 illustrate a second embodiment of the present invention, wherein:

FIG. 4 is a sectional view taken along line IV—IV of FIG. 5 and showing the state of a filter in accordance with the second embodiment where the filter is placed inside the water tank;

FIG. 5 is a sectional view taken along line V—V of FIG. 4 and showing the state of disposition of a sheet-like filter material; and FIG. 6 is a perspective view showing an exploded state of the filter.

FIGS. 8 through 12 illustrate a fourth embodiment of the present invention, wherein:

FIG. 8 is a sectional view taken along line VIII—VIII of FIG. 9;

FIG. 9 is a sectional view taken along line IX—IX of FIG. 8;

FIG. 10 is a perspective view of a case main body;

FIG. 11 is an enlarged sectional view of the rounded portion XI in FIG. 8; and

FIG. 12 is a sectional view taken along line XII—XII of FIG. 9.

DESCRIPTION OF THE PREFERRED EMBODIMENTS

Hereinafter, preferred embodiments of the present invention will be described with reference to the accompanying drawings.

Figure 1:
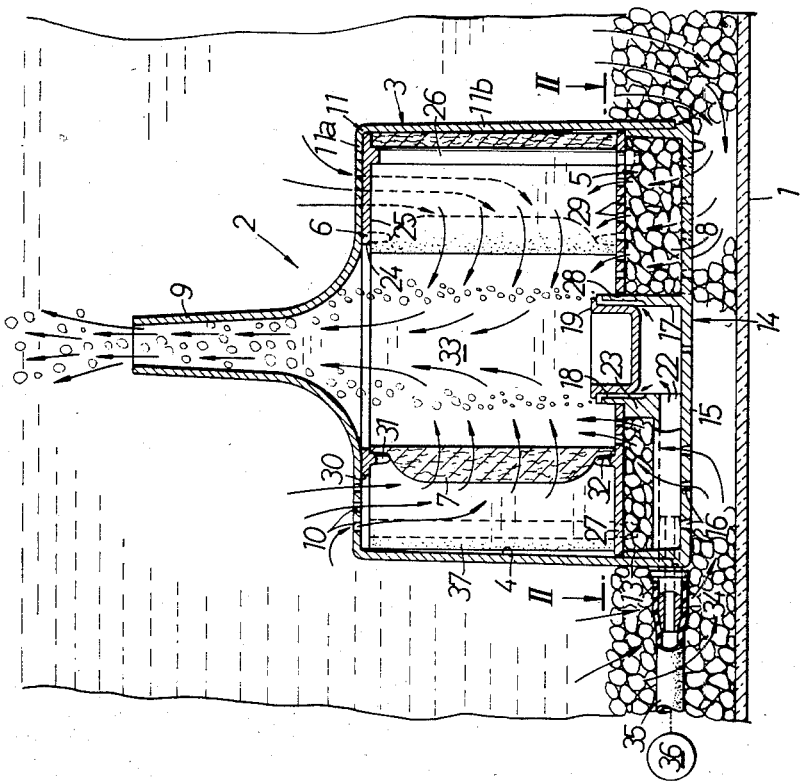

Referring initially to FIG. 1 which illustrates a first embodiment of the present invention, a filter 2 is shown disposed inside a water tank 1. A filter case 3 of this filter 2 consists of a square case main body 11 including an upwardly projecting drain pipe 9 formed integrally at the center of its upper surface 11a and a large number of suction ports 10 bored on the surface 11a around the drain pipe 9, and a lid 14 fitted removably to the lower open end of the case main body. A large number of suction ports 16 are bored radially on the bottom 15 of the lid 14, and a short cylindrical air feed port 17 having its upper end open projects integrally from the center of the bottom 15 of the lid 14. As can be best seen from FIG. 2, a large number of air passage grooves 18 having a corrugated cross-section are bored over the entire circumference on the inner peripheral surface of the air feed port 17. A cap 19 is fitted to the upper open end of the air feed port 17 so as to define air passage gaps between them by the air passage grooves 18. The hollow interior of the air feed port 17 is connected to the inner end of an air feed passage 22 that is formed integrally and protrusively on the bottom 15 of the lid 14, and the outer end of the air feed passage 22 is open to the side surface 13 of the lid 14. A plurality of support ribs 23 are formed equidistantly and integrally in the circumferential direction on the outer peripheral surface of the air feed port 17.

A frame member 6 is disposed inside the filter case 3. A drain port 24 is formed at the center of the frame member 6. The frame member 6 consists of a ceiling plate 25 having a star-like outer shape as a whole and a bottom plate 27 connected to the ceiling plate 25 by a plurality of connecting rods 26. The bottom plate 27 is equipped at its center with an open portion 28 which is fitted to the outer peripheral surface of the air feed port 17 that projects integrally from the center of the lid 14. A large number of passage holes 29 are bored around the open portion 28. A plurality of engagement protuberances 31 extending downward are formed equidistantly around the drain port 24 on the lower surface of the ceiling plate 25, and engagement protuberances 32 are also formed on the upper surface of the bottom plate 27 so as to correspond to the engagement protuberances 31, respectively.

The frame member 6 comes into abutment with the upper end surface of the side surface 13 of the lid 14 and with the upper end surface of the support ribs 23 around the outer circumference of the air feed port 17 at both outer and inner peripheral portions of the bottom plate 27, and is supported by the latter. The bottom plate 27 has substantially the same outer shape as the polygonal inner circumference of the square cylindrical side surface 11b of the case main body 11, and divides the interior of the filter case 3 into an upper filtration chamber 4 cummunicating with the suction ports on the upper surface 11a of the case main body 11, and a lower filtration chamber 5 communicating with the suction ports 16 on the bottom surface 15 of the lid 14, thereby forming a separator of the present invention.

Figure 2:
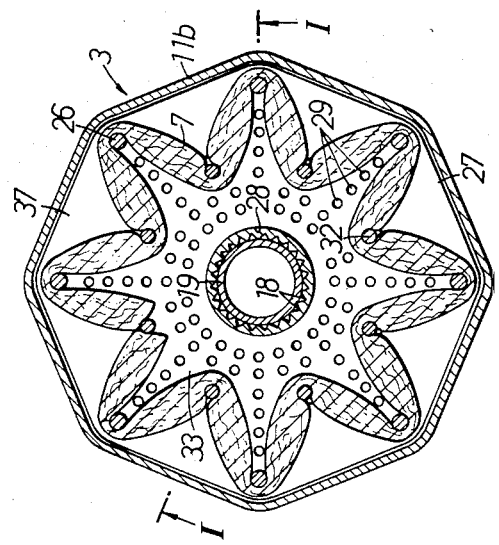
Figure 3:
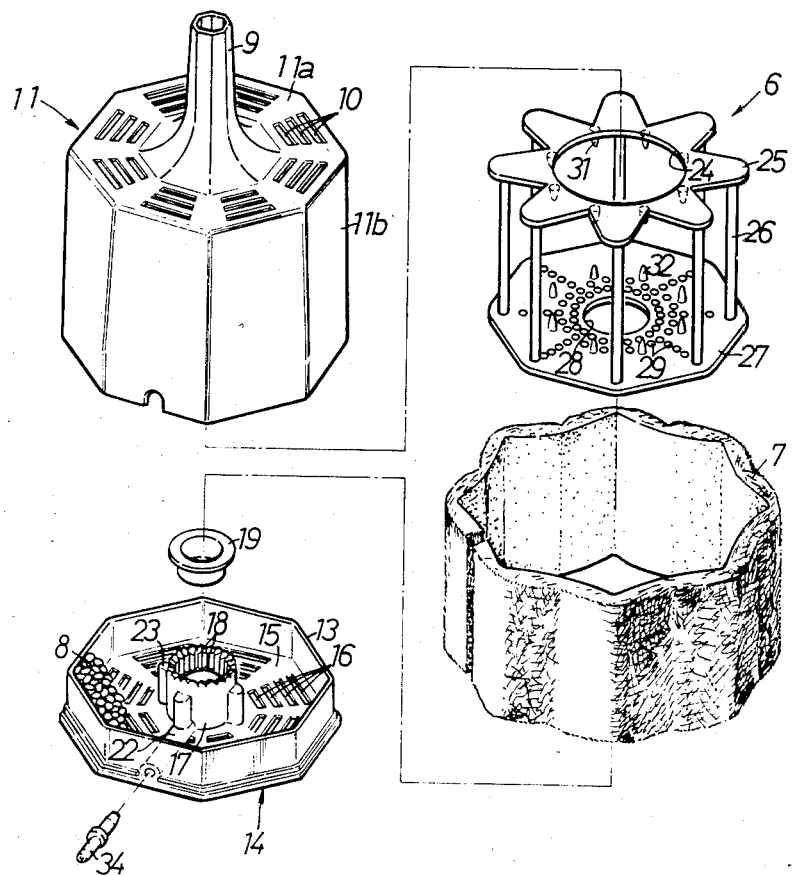

As shown in FIG. 2, the sheet-like compact filter material 7 is fixed to and supported by the frame member 6 as its inner peripheral surface is engaged with the connecting rods 26 while its outer peripheral surface is engaged alternately with the engagement protuberances 31 and 32 that are formed so as to oppose one another on the ceiling plate 25 and bottom plate 27, respectively. In other words, the sheet-like filter material 7 is disposed in the upper filtration chamber 4 while being bent in a corrugated form and being wound in the cylindrical form. A non-purification chamber 37 communicating with the upper suction ports 10 on the upper surface 11a of the case main body 11 and a purification chamber 33 which communicates with the drain pipe 9 projecting from the upper surface 11a of the case main body 11 via the drain port 24 of the ceiling plate 25 and has a relatively large capacity are defined outside and inside the filter material 7, respectively.

The purification chamber 33 communicates with the lower filtration chamber 5 defined by the bottom plate 27 and the inner surface of the lid 14, via a large number of passage ports 29 bored in the bottom plate 27 of the frame member 6, and also with the air feed port 17 via the air passage grooves 18.

A coarse filter material consisting of pebbles or the like is stored in the lower filtration chamber 5, and serves also as a weight to prevent floating of the filter 2 when the filter 2 is placed inside the water tank 1.

One of the ends of a connector 34 is removably fitted to the outer end of the air feed passage 22 communicating with the air feed port 17, which outer end opens to the side surface 13 of the lid 14, and the other end of the air feed passage 22 is connected to an air pump 36 via an air feed pipe 35.

Next, the operation of this embodiment will be described.

When the air pump 36 is actuated after the filter 2 having the construction described above is placed on the bottom of the water tank 1, the air is fed to the air feed port 17 through the air feed pipe 35, the connector 34 and the air feed passage 22, and is from thence jetted in a bubble form into the purification chamber 33 of the upper filtration chamber 4 through the air feed grooves 18 on the inner peripheral surface of the air feed port 17. The jet air rises as an air stream inside the purification chamber 33 and along with it, the water inside the purification chamber 33 also rises, so that the water is discharged into the water tank 1 through the discharge port 24 and the drain pipe 9. As a result, the suction force acts upon the purification chamber 33, and part of the contaminated water inside the water tank 1 is sucked into the non-purification chamber 37 from the suction ports 10 on the upper surface of the filter case 3 as represented by arrow in FIG. 1 and passes through the compact filter material 7. The purified water then flows into the purification chamber 33. The other part of the contaminated water in the tank 1 passes through the spacings between the pebbles spread on the bottom surface of the water tank 1 and is sucked into the lower filtration chamber 5 through the suction ports 16 bored in the lid 14 of the filter case 3. After the contaminated water passes through the coarse filter material placed in the lower filtration chamber 5 and is purified by it, the resulting purified water flows into the purification chamber 33 of the upper filtration chamber 4 through the through-holes 29 on the bottom plate 27 of the frame member 6. The water inside the purification chamber 33, that has been purified after passing through the filter materials 7 and 8, flows into the drain pipe 9 through the discharge port 24 opening at the ceiling plate 25 together with the air that is introduced into the purification chamber 33 from the air feed port 17 through the air feed grooves 18, which water is thereafter returned to the water tank 1 as the purified water.

The compact filter material 7 inside the upper filtration chamber 4 has higher flow resistance of water than the coarse filter material 8 inside the lower filtration chamber 5, so that the velocity of the contaminated water flowing through the compact filter material 7 becomes relatively low. Accordingly, the water promotes the propagation of aerobic microorganisms including useful bacteria such as chlorella, that are otherwise difficult to grow if the velocity of water flow is high, and these microorganisms decompose organic matters attaching to the filter material 7 such as the residual bait and droppings of fish, preventing clogging of the filter material 7. Moreover, the bacteria such as chlorella can be used as living bait for the aquarium fishes.

The compact filter material 7 placed in the upper filtration chamber 4 is more likely to get clogged than the coarse filter material 8 stored in the lower filtration chamber 5. However, since the water inside the water tank 1 always flows into the purification chamber 33 of the upper filtration chamber 4 through the coarse filter material 8 having relatively low flow resistance inside the lower filtration chamber 5, the suction force always acts upon the purification chamber 33 and hence, the water inside the non-purification chamber 37 of the upper filtration chamber 4 is sucked into the purification chamber 33 through the compact filter material 7. Therefore, the flow of water from the non-purification chamber 37 to the purification chamber 33 never stops, and the excellent filtrating operation by the compact filter material 7 can be kept for an extended period of time.

Figure 4:
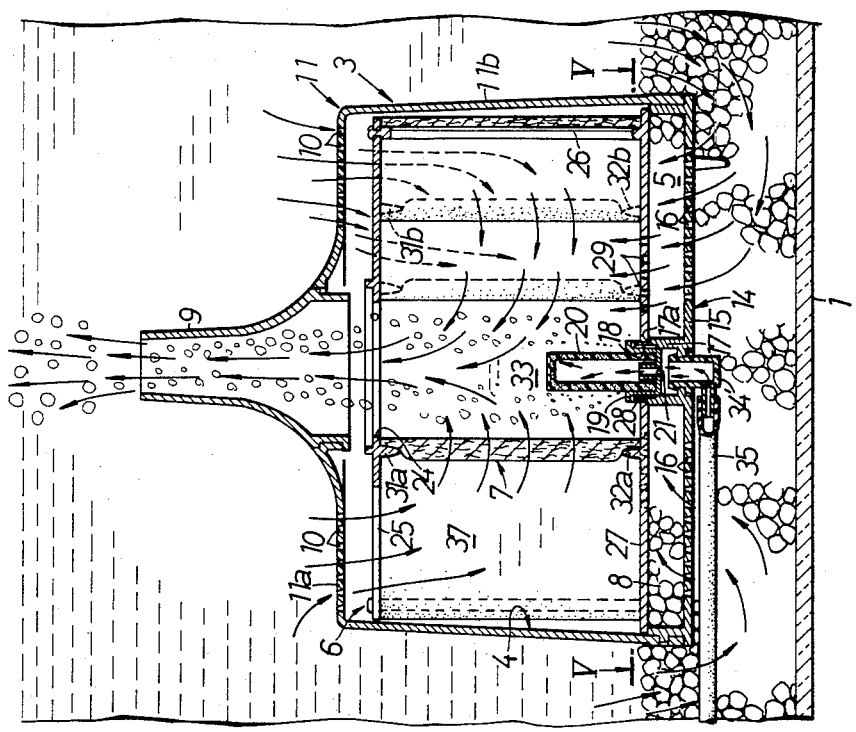
Figure 5:
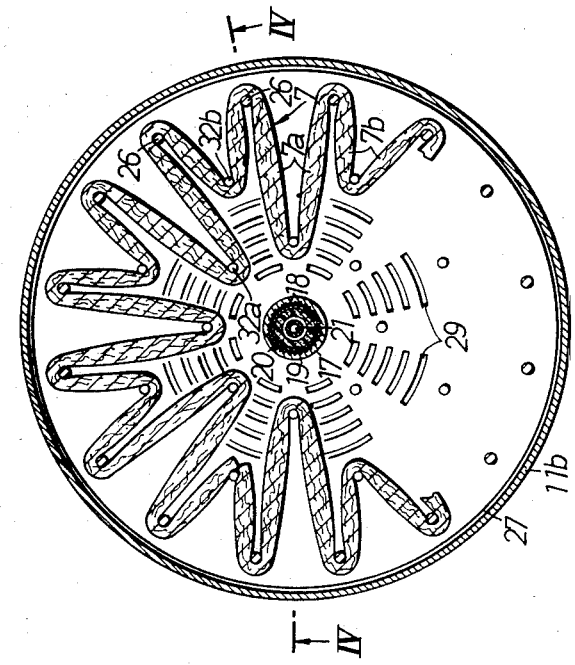
Figure 6:
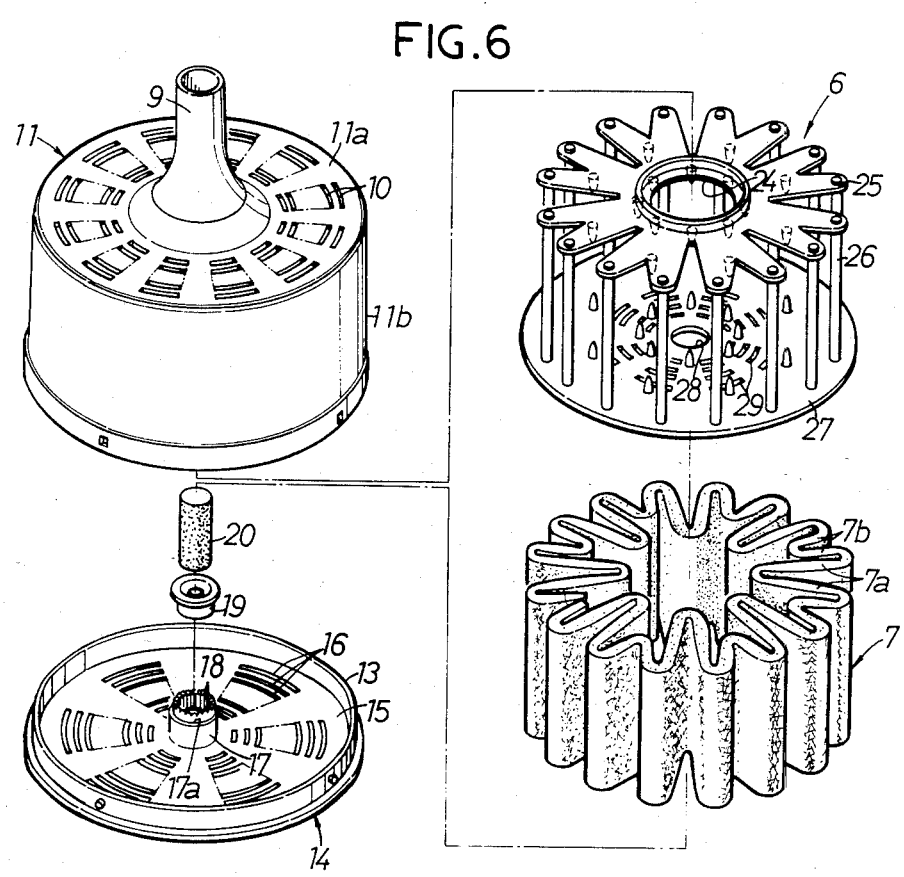

FIGS. 4 through 6 illustrate a second embodiment of the present invention, in which like reference numerals are employed to identify like constituents as in the first embodiment.

As can be best seen from FIG. 5, the sheet-like compact filter material 7 in this embodiment is fixed to and supported by the frame member 6 and its inner peripheral surface is supported by the connecting rods 26 while its outer peripheral surface is alternately engaged with the engagement protuberances 31a, 31b and 32a, 32b that are formed on the ceiling plate 25 and the bottom plate 27 so as to oppose one another, respectively. In other words, the sheet-like filter material 7 is formed to have a corrugated peripheral wall that is bent in the radial direction. The corrugated peripheral wall consists of long wave portions 7a of a large wave height which extend radially in the circumferentially spaced manner and short wave portions 7b of a short wave height formed continuously between the adjacent long wave portions 7a, 7a.

A hollow air jet cylinder 20 made of an air permeable material such as a foamed synthetic resin and having its upper end closed is fitted to the cap 19, and the hollow interior of this air jet cylinder 20 communicates with the air feed port 17 through a passage port 21 formed on the cap 19.

A connector 34' is rotatably fitted to the bottom surface of the air feed port 17, and is connected to an air pump, not shown, via the air feed pipe 35.

A plurality of engagement protuberances 31a and 31b are formed integrally and protrusively on the lower surface of the ceiling plate 25 in inner and outer two circular lines in the concentric arrangement so as to extend downward and equidistantly around the drain port 24. Likewise, a plurality of engagement protuberances 32a and 32b are integrally formed on the upper surface of the bottom plate 27 in such a manner as to correspond to the engagement protuberances 31a and 31b, respectively.

The frame member 6 comes into abutment with and is supported by the upper edge surface of the side surface 13 of the lid 14 and a step-like shoulder 17a of the outer circumference of the air feed port 17, at the inner and outer peripheral portions of the bottom plate 27.

The operation of this second embodiment will be described. As described above, the cylindrical filter material 7 disposed in the upper filtration chamber 4 formed inside the filter case is formed to have a corrugated peripheral wall that is bent in the radial direction, and this corrugated peripheral wall consists of the long wave portions 7a of a large wave height which extend radially in the circumferentially spaced manner, and the short wave portions 7b of a small wave height formed between the long wave portions 7a, 7a so as to continue them. With this arrangement, the filtration area of the filter material 7 can be remarkably increased because all the radially inner-most parts of the corrugated wall need not be arranged in a high density on substantially the same circumference as in the prior art device in which the height of the wave portions of the filter material is substantially the same. Since the sufficient spacings can be defined between the inner-most parts of the adjacent long wave portions 7a of the filter material, the flow of fluid from the peripheral portion of the purification chamber 33 toward the center of the purification chamber 33 defined inside the filter material 7 is never inhibited, and the entire surface of the filter material 7 can be effectively utilized to improve the filtration efficiency. Accordingly, the filtration capacity can be easily increased without increasing the outer peripheral diameter of the filter material 7 which is disposed cylindrically.

Figure 7:
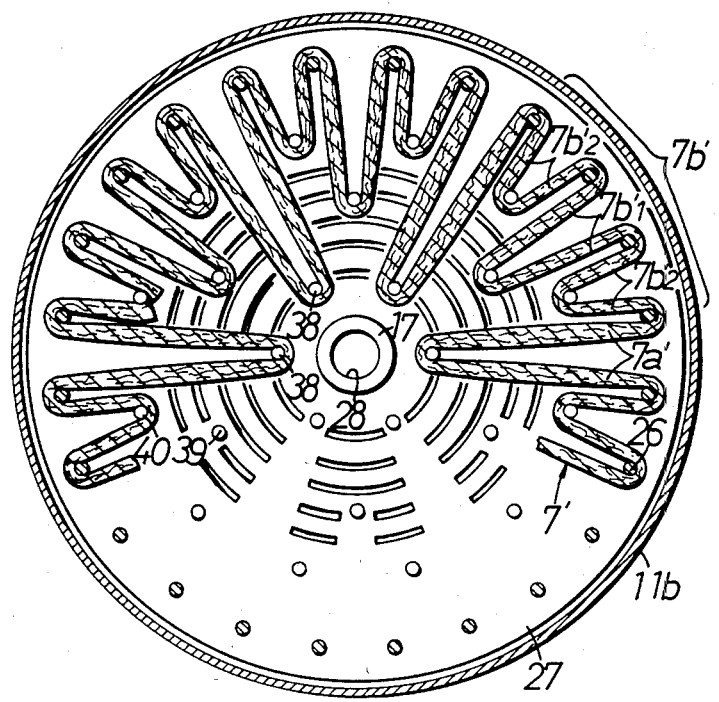
FIG. 7 illustrates a third embodiment of the present invention, showing a sectional view similar to FIG. 5.
Figure 8:
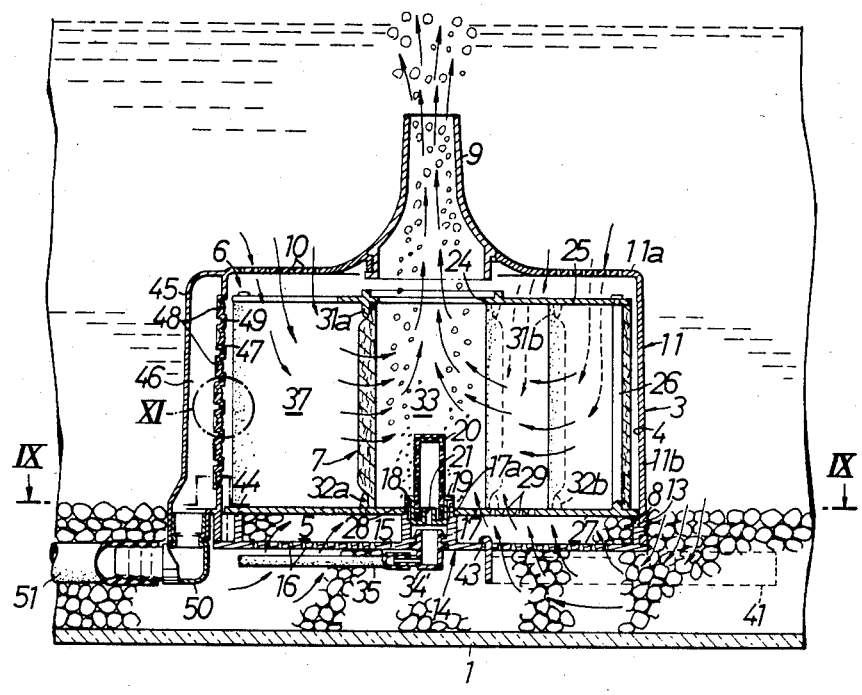

FIG. 7 illustrates a third embodiment of the present invention. A large number of engagement protuberances 38, 39 and 40 are formed on the ceiling plate (not shown) and bottom plate 27 of the frame member 6 in at least three concentric circles having mutually different diameters with their phases being appropriately deviated in the circumferential direction. The sheet-like filter material 7' is engaged with the connecting rods 26 and alternately with the engagement protuberances 38, 39 and 40, and is thereby fixed and held in place. In this case, the short wave portions $7b'$ consisting of three short waves are formed between the mutually adjacent long wave portions $7a'$, $7'$ having a large height, and the short wave $7b_1'$ at the center has a greater wave height than those of the short wave portions $7b_2'$, $7b_2'$ on both sides.

FIGS. 8 through 11 illustrate a fourth embodiment of the present invention, wherein like reference numerals are used to identify like constituents as in the foregoing embodiments.

Figure 11:
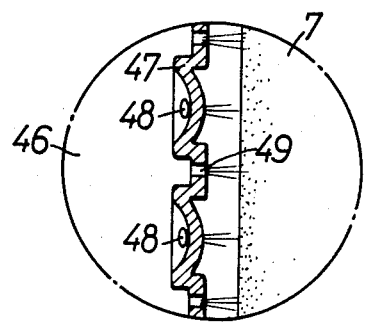

A half split type cylindrical cover 45 is integrally fixed to the side portion 11b of the case main body 11 of the filter case 3 and extends in the vertical direction, thereby forming a pure fluid chamber 46 on the external side of the case main body 11. This pure fluid chamber 46 is defined over the entire length of the filter material 7 in its axial direction, and a separator 47 is interposed between the pure fluid chamber 46 and the non-purification chamber 37. As shown in FIG. 11 which is an enlarged view, a plurality of first nozzles 48 and a plurality of second nozzles 49 are alternately formed in the vertical direction on this separator 47. The first nozzles 48 are directed towards one side of the circumferential direction of the frame member 6 (clockwise in FIG. 9) with respect to the radial direction of the frame member 6, while the second nozzles 49 are open in the radial direction of the frame member 6. A connection tube 51 such as a vinyl tube is connected to the pure fluid chamber 46 via a connector 50. This connection tube 51 is connected to a pure fluid feed source 52 such as a water tap or the like.

Figure 9:
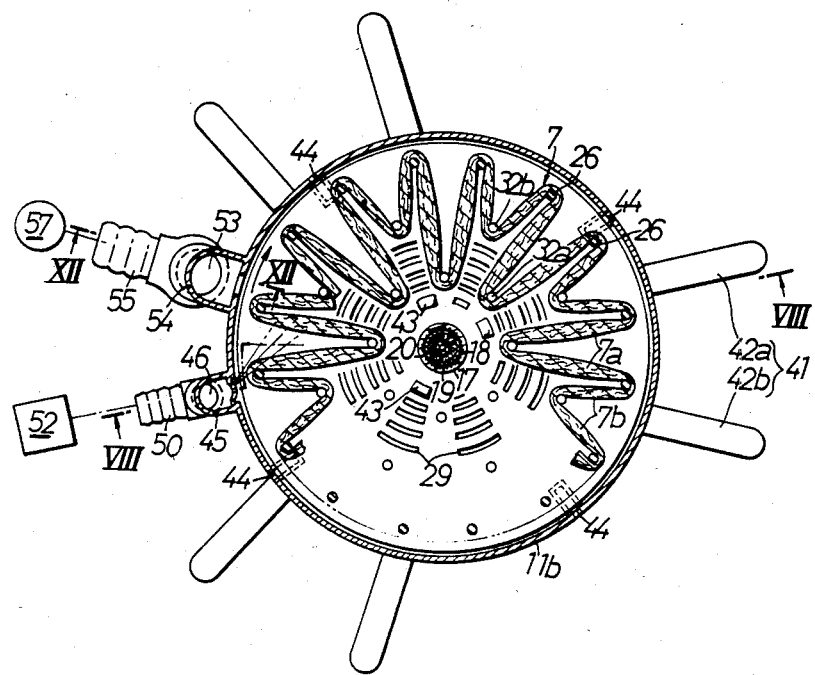
Figure 10:
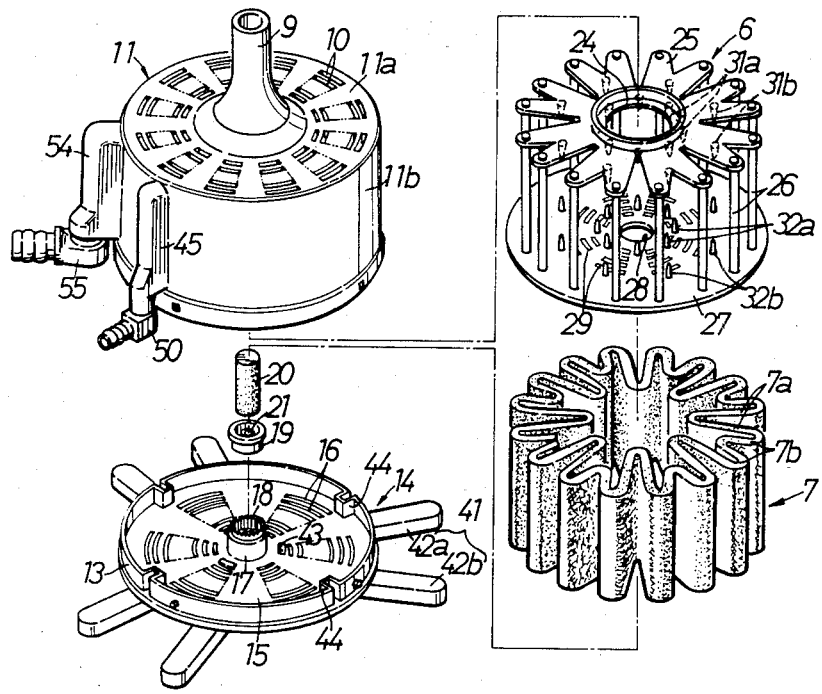
Figure 12:
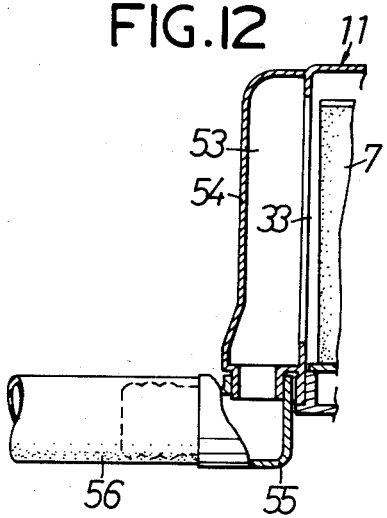

Referring to FIG. 12, a half split type cylindrical cover 54 is integrally fitted to the side portion 11b of the case main body 11 at a position thereof offset relative to the adjacent purified chamber 46 in the circumferential direction of the frame member 6 (clockwise in FIG. 9). This discharge chamber 53 extends over the entire axial length of the filter material 7 and is connected to the non-purification chamber 37. A connection pipe 56 such as a vinyl tube is connected to this discharge chamber 53 via a connector 55, and the connection pipe 56 is in turn connected to a suction pump 57.

A plurality of legs 41 engage with the lid 14. Each leg 41 is formed by connecting a pair of leg bases 42a, 42b, that are spaced apart progressively from each other as they separate outward from the lid 14 in the radial direction, at their inner positions in the radial direction of the lid 14. An engagement protuberance 43 formed at the base of each leg 41 engage with the suction port 16 at the radially innermost position of the lid 14. A plurality of support beds 44, that are recessed inward in the radial direction, are disposed at a plurality of positions in the circumferential direction of the lid 14 at its side portion 13.

The operation of this fourth embodiment will be described. Although the filter material 7 can keep its excellent filtration efficiency for an extended period of time, the gradual decrease of filtration efficiency cannot be avoided because sludge attaches to the outer surface of the filter material 7 in the course of use of the filter for a long period. After filtration is made for a long period, therefore, the operation of the air pump is temporarily stopped to stop filtration, the suction pump 57 is actuated and at the same time, pure water such as tap-water is supplied into the pure fluid feed chamber 46 from the pure fluid feed source 52. Then, the pure water is jetted from the first and second nozzles 48 and 49 towards the filter material 7. The pure water jetted from the first nozzle 48 impinges against the corrugated peripheral wall of the filter material 7 and removes the sludge, and at the same time, applies a force of rotation to the filter material 7 and to the frame member 6 in one of the circumferential directions (clockwise in FIG. 2). Accordingly, the filter material 7 as well as the frame member 6 rotate, and the jet pure water from the first and second nozzles 48 and 49 is sequentially sprayed to the corrugated peripheral wall of the filter material 7 in its circumferential direction. In this instance, the second nozzles 49 jet the pure water so that it can reach the deep spacings between the short wave portions $7b$ and the long wave portions $7a$. In this manner, the entire outer surface of the filter material 7 is cleaned by the first and second nozzles 48 and 49, and the removed sludge flows in one of the circumferential direction inside the non-purification chamber 37 with the rotation of the filter material 7, and is thereafter discharged from the discharge chamber 52 by the sucking operation of the suction pump 57. Accordingly, the filter material 7 can be cleaned automatically without the necessity of disassembling the filter case 3 and removing the filter material 7 out from the case. Thus, the necessity of the disassembly of the filter case 3 that has been required in the prior art device is eliminated, and the filter of the present invention is extremely convenient.

What is claimed is:

1. A filter comprising a filter case the interior of which is divided by a separator into upper and lower filtration chambers, a compact filter material of a cylindrical shape disposed in said upper filtration chamber so as to define on both outer and inner sides thereof a non-purification chamber communicating with upper suction ports formed at the upper part of said filter case and a purification chamber communicating with a drain pipe disposed on the upper surface of said filter case and having a large capacity, and a coarse filter material housed in said lower filtration chamber and serving also as a weight, said lower filtration chamber communicating with said purification chamber through passage ports formed in said separator while communicating with lower suction ports formed in a bottom surface of said filter case, said purification chamber communicating with an air feed port connected to an air pump.

2. A filter as defined in claim 1 wherein said cylindrical compact filter material has a corrugated peripheral wall bent in the radial direction, said corrugated peripheral wall consisting of long wave portions which extend radially in the circumferentially spaced manner and have a large wave height, and short wave portions of a short wave height formed between adjacent long wave portions continuously with said long wave portions.

3. A filter as defined in claim 1 wherein said cylindrical compact filter material is fitted to a frame member which is supported in said filter case rotatably around the axis of the case, a pure fluid chamber and a discharge chamber are disposed on the outside surface of said filter case so as to extend over the entire axial length of said compact filter material, said pure fluid chamber being separated from said non-purification chamber by a separator, said discharge chamber taking a position adjacent to said pure fluid chamber with an offset phase therebetween in the circumferential direction of said cylindrical compact filter material and communicating with said non-purification chamber, said separator being provided with a plurality of nozzles opening towards one side of a radial plane of said compact filter material, on which the nozzles are located, as offset in the circumferential direction of said compact filter material.

* * * * *